United States Patent [19]
Brackett et al.

[11] Patent Number: 5,487,300
[45] Date of Patent: Jan. 30, 1996

[54] TANK GAUGING APPARATUS AND METHOD

[75] Inventors: Anne W. Brackett; Marcus O. Durham, both of Tulsa; Lynn K. Perkins, Skiatook; Gregory E. Thoman, Tulsa, all of Okla.

[73] Assignee: W. L. Walker Co., Inc., Tulsa, Okla.

[21] Appl. No.: 241,965

[22] Filed: May 12, 1994

Related U.S. Application Data

[62] Division of Ser. No. 901,563, Jun. 19, 1992, Pat. No. 5,333,498.

[51] Int. Cl.$^6$ ................................................ G01F 23/00
[52] U.S. Cl. ................................................ 73/61.59; 73/201
[58] Field of Search ................................ 73/61.43, 61.46, 73/61.59, 61.61, 61.71, 61.73, 198, 201, 861

[56] References Cited

U.S. PATENT DOCUMENTS

| | | | |
|---|---|---|---|
| 4,145,914 | 3/1979 | Newman | 73/290 |
| 4,229,798 | 10/1980 | Rosie et al. | 364/564 |
| 4,718,443 | 1/1988 | Adney et al. | 73/223 |
| 4,748,846 | 6/1988 | Haynes | 73/290 |
| 4,805,453 | 2/1989 | Haynes | 73/292 |
| 4,827,762 | 5/1989 | Hasselmann | 73/49.2 |
| 4,856,343 | 8/1989 | Hon | 73/861 |
| 4,897,797 | 6/1990 | Free, Jr. et al. | 364/500 |
| 4,969,365 | 11/1990 | Strigård et al. | 73/861.77 |
| 5,136,882 | 8/1992 | Wada | 73/198 |
| 5,138,559 | 8/1992 | Kuehl et al. | 364/509 |
| 5,226,320 | 7/1993 | Däges et al. | 73/290 |
| 5,309,760 | 5/1994 | Watanabe et al. | 73/149 |
| 5,313,842 | 5/1994 | Marsh et al. | 73/861 |

*Primary Examiner*—Hezron E. Williams
*Assistant Examiner*—Richard A. Moller
*Attorney, Agent, or Firm*—Head & Johnson

[57] ABSTRACT

Apparatus and method are disclosed for measuring the quantity of a liquid, such as crude oil, transferred to or from a storage tank with all measurements being taken through an opening near the bottom of the tank. A water detecting probe is extendable through the opening a selected distance below the opening in order to detect the presence of water at a selected level below the opening and generate a detection signal. A sampling device is connectable to the opening for taking samples of the liquid transferred to or from the tank. A pressure sensor is connected to the opening for generating a pressure signal indicative of the pressure of the liquid in the tank. A computer is provided for using the pressure signal to generate a level signal indicative of the level of the liquid in the tank. Communication circuitry may be provided for receiving an enabling signal from a remote location and enabling the initiation, measurement, and termination of a liquid transfer and for transmitting the detection signal and the measurements and indications of the liquid transfer to the remote location.

28 Claims, 6 Drawing Sheets

TANK GAUGING APPARATUS AND METHOD

This is a divisional application of Ser. No. 07/901,563 filed on Jun. 19, 1992, now U.S. Pat. No. 5,333,498.

BACKGROUND OF THE INVENTION

This invention relates to apparatus and method for measuring the quantity of a liquid transferred to or from a storage tank. More particularly, the invention relates to apparatus and method for the custody transfer of crude oil from a storage tank.

An important step in the production of oil and gas is the custody transfer of the produced crude oil from the storage tank at the well site to a pipeline, railway car, or tank truck. At the present time, when a tank of oil is transferred, or "run", the transfer is measured by manually "gauging" the depth of the oil in the tank through a hatch in the top of the tank before and after the transfer is completed. Before initiating the transfer, the person responsible for documenting the transfer (the "gauger") must climb to the top of the tank, open the tank to the atmosphere, suspend a thermometer in the oil in the tank, lower a sample-taking device known as a "thief" to take a sample in the upper third of the tank, lower a thief into the tank to take a sample at the level of the outlet, determine the free water and sediment level in the tank using the outlet level sample or using a separate measurement from the top of the tank, take the opening "gauge" (measurement of the height of the crude oil in the tank) using a tape and bob lowered from a reference point on the top of the tank, read the thermometer, climb down from the tank, break the tank outlet seal, and begin pumping oil from the tank (assuming the sediment and water level is at least four inches below the outlet). The gauger uses the samples and the temperature measurement to compute the average API specific gravity, temperature, and sediment and water content. After the pumping is completed, the gauger must close and seal the tank outlet valve, climb to the top of the tank and take the closing gauge, and complete and distribute the run tickets which document the measurements taken during the run, or transfer.

The preceding description is at best a summary and oversimplification of the custody transfer procedures used at this time. The procedures are described in detail in the "Manual of Petroleum Measurement Standards Chapter 18-Custody Transfer" published by the American Petroleum Institute (API).

Despite the fact that the above-described procedure is the procedure recommended by the API and followed by the oil and gas industry, it is well known to be dangerous to the gauger and hazardous to the environment. When the gauger opens the top of the tank, he exposes himself and the environment to the fumes inside the tank. Over the years, many gaugers have died from exposure to hydrogen sulfide fumes from an open tank. The fumes may be explosive and precautions must be taken to prevent sparks from metal contact and static electricity. Environmental groups are urging the state legislatures to enact laws which would prohibit the discharge of fumes from open tanks to the atmosphere. Additionally, the tanks deteriorate with age and prolonged exposure to components of some crude oils which can weaken the tank, making it dangerous for the gauger to climb the tank. After completing the transfer, the gauger must manually complete and distribute the run ticket which documents the transfer, which creates a potential for human error, loss of the run ticket, and delays communication of the transfer to the buyer and seller.

It is also common to have two or more tanks ("lease tanks") on a leased property near the well site which are connected to a pipeline. The pipeline is typically connected to the crude oil purchaser's stock tank, which may be many miles from the lease tanks. The gauger may travel and service lease tanks at many well sites scattered over a 200 mile or more radius from the stock tank. Typically, the gauger will go to a well site, take the opening gauge of a lease tank and go through the API procedure necessary to initiate a transfer, open the tank outlet valve to the pipeline, and then travel to another well site and do the same, and so on. It may be three to five days before the gauger returns to an open tank to take the closing gauge, close, and reseal the lease tank. Therefore, it may be three to five days before the run ticket is made and distributed and it may be three to five days before the purchaser knows how much oil was run from a lease tank and whether the same amount arrived at the purchaser's stock tank.

The fact that the above-described procedure is the API and industry standard, and has been for about sixty years, attests to the long-felt need for a custody transfer apparatus and method which does not require the gauger and the environment to be exposed to the contents and fumes existing in the tank, which does not require the gauger to open the tank to the environment, which does not require the gauger to climb on the tank, and which makes an accurate, permanent record of the transfer which can be printed out at the tank as well as electronically transferred to a remote location through a communications link with a telephone system or the like. There is also a need for such an apparatus and method which will electronically communicate with a remote location, allow a tank to be run (opened and closed) remotely without the gauger going to the lease tank, create a permanent run record, and communicate the run data to the remote location at the time the run is being made. There is also a need for such an apparatus which does not require a new opening to be made in the tank, as sour gas (such as hydrogen sulfide) becomes entrapped in the walls of operating tanks and can explode if an opening is cut in the tank.

Attempts have been made to provide apparatus which improve the tank gauging procedure. For example, CTI Manufacturing, Inc. of Houston, Tex. manufactures a sonar tank gauge known as Accu-Gage™. The Accu-Gage™ device measures the level in a tank using an ultrasonic transducer to generate an ultrasonic pulse which travels up through the liquid and reflects from the top surface back down to the ultrasonic probe. The probe is inserted into the tank near the bottom of the tank. The probe must be located away from turbulence and internal constructions and therefore cannot be positioned in or near a turbulent inlet or outlet. Consequently, the probe location cannot be used to take a composite sample or to measure the temperature of the liquid transferred as the "nonturbulent" location may not provide a representative sample of the liquid transferred. This means that the top of the tank must be manually opened to take a sample which creates the problems previously discussed. Also, the ultrasonic probe will not read an interface or level within six inches of the probe, as it has a minimum range of six inches; and therefore it cannot be used to give a closing gauge at tank outlet level (normally 12 inches) as the probe must be mounted a minimum of 12 inches above the bottom of the tank. In other words, the tank cannot be drained down to outlet level using the Accu-Gage™, which unnecessarily and undesirably reduces the storage and sales capacity of the tank. Further, the presence of emulsion and particulate matter in the liquid, as is common in crude oil, can affect the reliability of the readings of an ultrasonic probe. The Accu-Gage™ device can communicate digitally with remote computers.

Digi-Con Corporation of Marysville, Washington manufactures a non-intrusive ultrasonic level sensor which is mounted externally on the bottom (or at the top) of a tank and which has a transceiver for communicating with a personal computer-based monitoring system. As the Accu-Gage™ system, the Digi-Con system does not disclose a method of sampling the tank contents without opening the top of a tank and may be unreliable if emulsion or particulate matter is present.

Neither the Accu-Gage™ nor the Digi-Con system discloses a method of automatically creating a permanent run record, compensating for sediment and water content, of indicating when water is present at an unacceptable level in the bottom of the tank, of reliably measuring level when emulsion or particulate matter is present in the liquid, or of initiating, measuring, and terminating the transfer of liquid to or from a storage or lease tank from a remote location without a gauger going to the tank to open or close the tank. The shortcomings of the prior attempts to improve the tank gauging procedure are evidenced by the fact that they have had no effect on the API standard.

SUMMARY OF THE INVENTION

The present invention is contemplated to overcome the foregoing deficiencies and meet the above-described needs. For accomplishing this, the present invention provides a novel and improved tank gauging apparatus and method. The invention provides advances in transfer methodology, environmental protection, and personnel safety over the existing 60 year old industry standard procedure.

The apparatus and method for measuring the quantity of a liquid, such as crude oil, transferred to or from a storage tank with all measurements being taken through an opening near the bottom of the tank, comprises a conduit having a first open end connectable to the opening in the tank, a second open end, and a plurality of connections for accessing the interior of the conduit; detecting means for detecting the presence of other matter in the tank and generating a detection signal indicative thereof, the detecting means having a sensor connectable to a connection of the conduit so that the sensor extends through the opening into the tank; and measuring means, connectable to a connection of the conduit, for measuring and indicating the quantity of liquid transferred.

Preferably, the opening is a tank outlet and the first end of the conduit is connected to the tank outlet and the second end of the conduit is connected to a tank outlet valve. The preferred detecting means includes a water detecting probe which is extendable a selected distance below the level of the opening in the tank in order to detect and indicate the presence of water at a selected level below the opening. Sampling means are connectable to a connection of the conduit for taking samples of the liquid transferred to or from the storage tank.

The preferred measuring means includes a pressure sensing means for generating a pressure signal indicative of the pressure of the liquid in the tank, computer means for receiving and using the pressure signal to generate a level signal indicative of the level of the liquid in the tank; and display means for receiving and using the level signal to display the level of the liquid in the tank.

The measuring means may further provide communication means for receiving an input signal indicative of the density of the liquid in the tank and generating a density signal. The computer means receives and uses the pressure signal and density signal to generate a density-corrected level signal. The display means receives the density-corrected level signal and displays the density-corrected level of the liquid in the tank.

The measuring means may also provide temperature sensing means for generating a temperature signal indicative of the temperature of the liquid in the tank or transferred to or from the tank. The computer means receives the temperature signal and uses the density signal, pressure signal, and temperature signal to generate a temperature-corrected level signal indicative of the level of the liquid at the sensed temperature of the liquid. The display means receives and uses the temperature-corrected level signal to display the temperature-corrected level of the liquid in the tank.

The apparatus and method may also be used for remotely measuring the quantity of a liquid, such as crude oil, transferred to or from a storage tank with all measurements being taken through an opening near the bottom of the tank. In the remotely operated apparatus and method, the communication means provides for receiving an enabling signal from a remote location and enabling the apparatus to initiate, measure, and terminate a liquid transfer and for transmitting the detection signal and the measurements and indications of the measuring means to the remote location. Preferably, the communication means receives and transmits the pressure and temperature signals to the remote location. In the remote operated apparatus and method, the computer means may provide for receiving and using the pressure signal and temperature signal to generate a temperature-corrected level signal indicative of the level of the liquid in the tank at the temperature of the liquid indicated by the temperature signal; and the communication means may receive and transmit the temperature-corrected level signal to the remote location. The communication means further provides for receiving the enabling signal from the remote location and enabling the sampling means to take the sample of the liquid transferred.

It is an advantage of the present invention to allow gauging of crude oil tanks and other vessels with reduced exposure of the contents of the tank to the atmosphere.

It is an advantage of the present invention to eliminate the need for personnel to climb on crude oil storage tanks during gauging.

It is an advantage of the present invention that it does not require new holes to be made in the tank, but utilizes an existing opening and leaves the opening available for other uses.

It is an advantage of the present invention to provide level measurement, temperature measurement, sampling, and water detection through one opening in the tank.

It is an advantage of the present invention to reliably and accurately measure the level of a liquid containing emulsions and particulate matter.

It is an advantage of the present invention to allow the tank to be emptied to the tank outlet level while taking all measurements at the tank outlet level.

It is an advantage of the present invention to provide tank gauging apparatus and method which will electronically communicate with a remote location, allow an unmanned storage or lease tank to be run (opened and closed) remotely without a gauger going to the lease tank, create a permanent run record, and communicate the run data and run record to the remote location at the time the run is being made.

BRIEF DESCRIPTION OF THE DRAWINGS

The present invention will be better understood by reference to the examples of the following drawings.

DETAILED DESCRIPTION OF THE PREFERRED EMBODIMENTS

Figure 2:
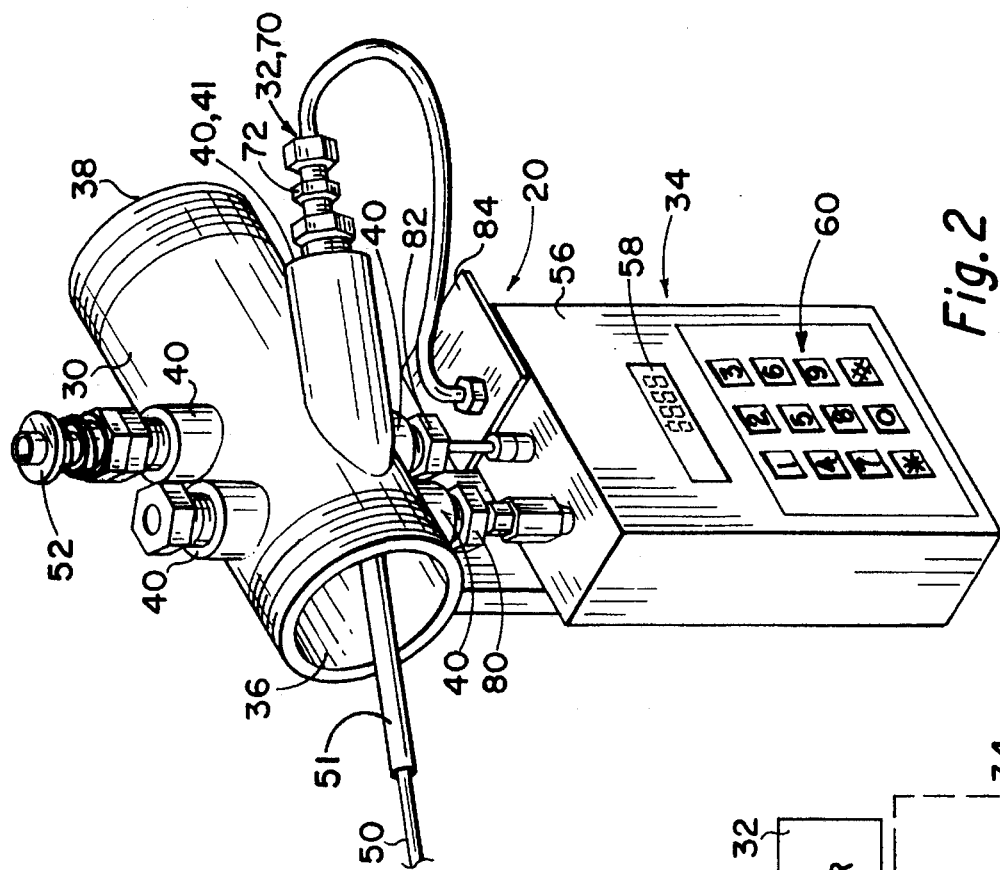
FIG. 2 is a perspective view of an embodiment of the tank gauging apparatus of the present invention.

Preferred embodiments of the invention will now be described with reference to the drawings, wherein like reference characters refer to like or corresponding parts throughout the drawings and description.

FIGS. 1–5 present embodiments of the apparatus and method of the present invention, generally designated 20, for measuring the quantity of a liquid 21, such as crude oil, transferred to or from a storage tank 22 with all measurements being taken through an opening 24 near the bottom of the tank 22. Although the apparatus 20 is described herein as used with crude oil and crude oil storage tanks, it is intended to be understood that the apparatus 20 may be used to measure virtually any fluid flowing to or from virtually any type of fluid-containing device.

Figure 1:
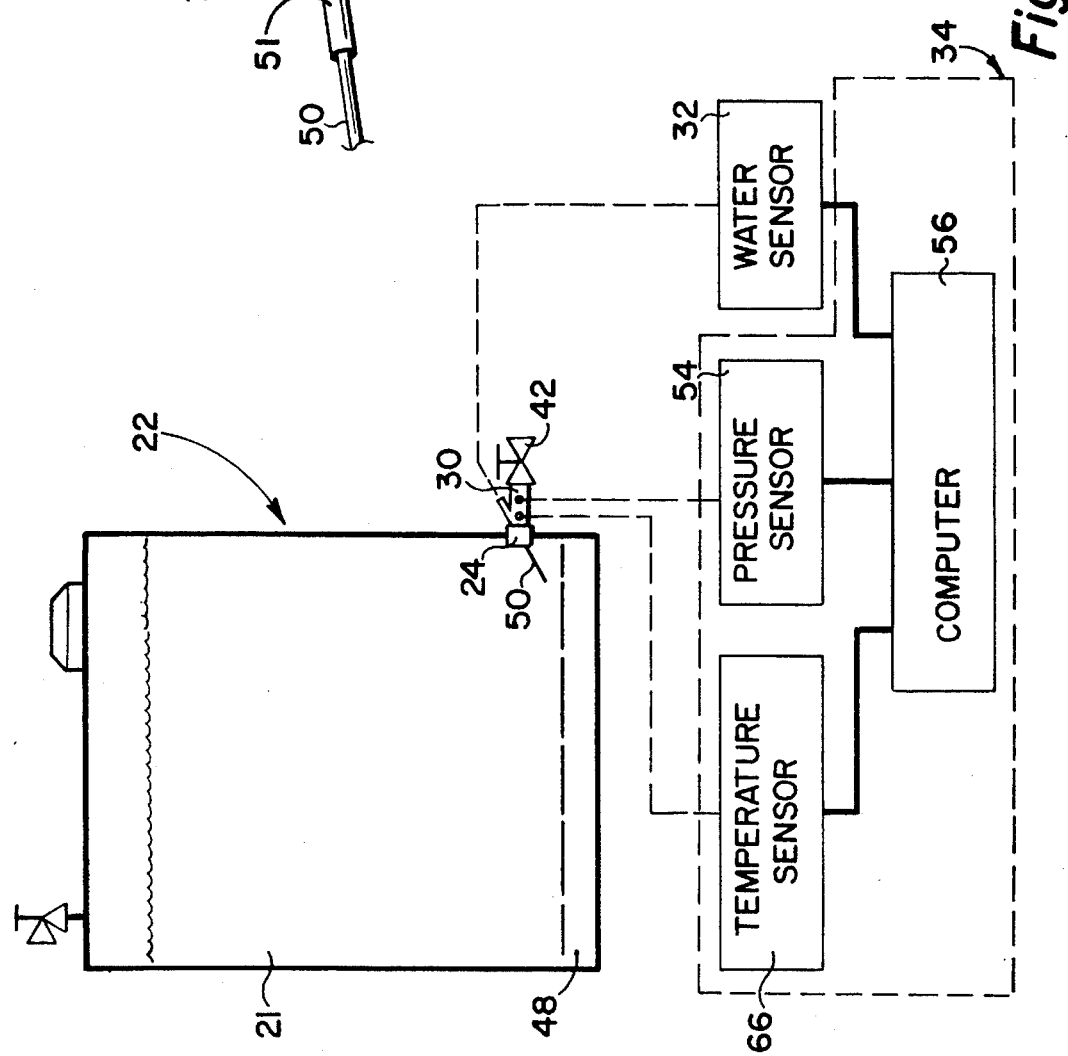
FIG. 1 is a block diagram of an embodiment of a tank gauging apparatus of the present invention.
Figure 3:
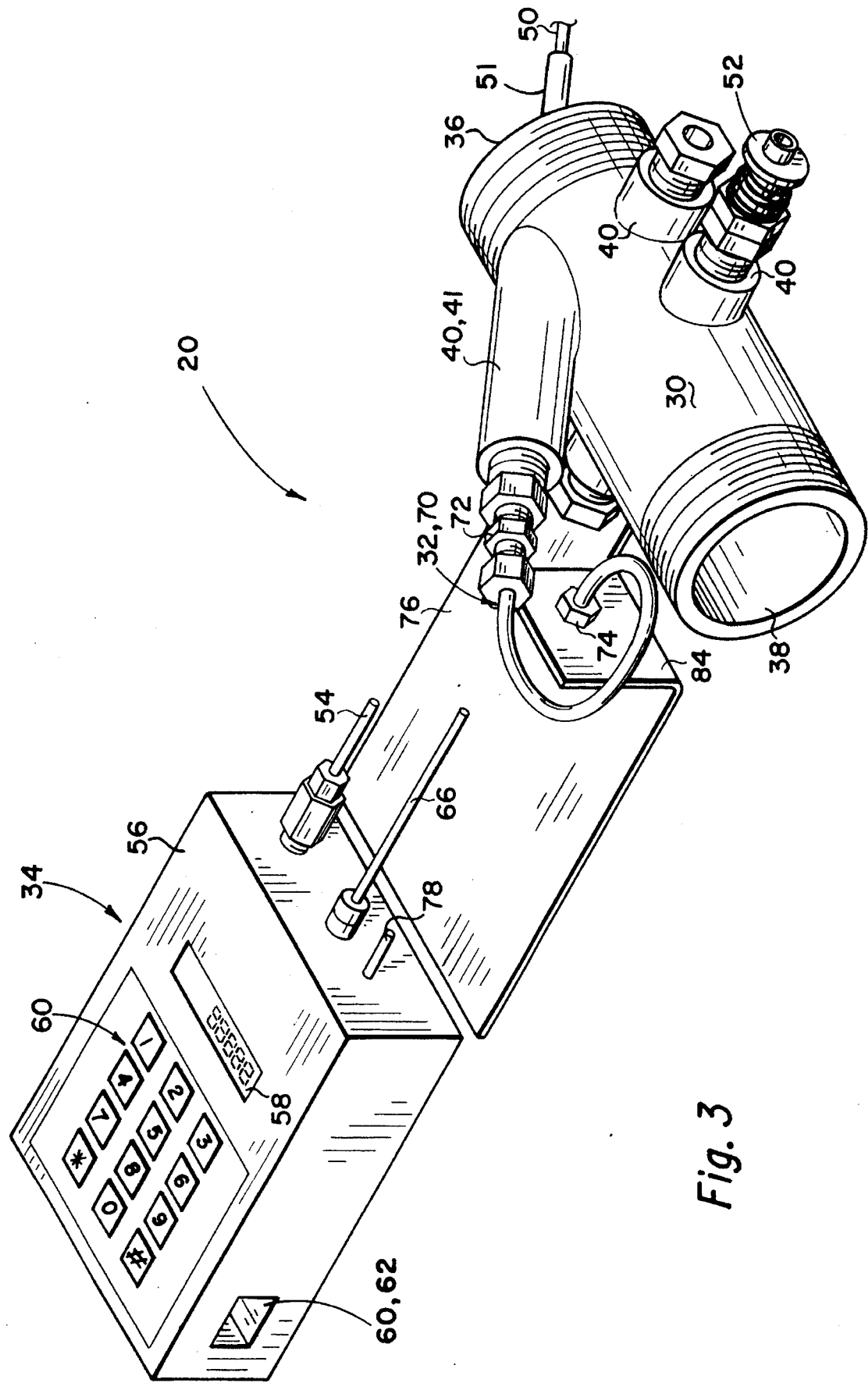
FIG. 3 is an exploded perspective view of an embodiment of the tank gauging apparatus of the present invention.

Referring to the example of FIGS. 1–3, the apparatus 20 may be generally described as including conduit 30, detecting means 32, and measuring means 34. The conduit 30 has a first open end 36 connectable to the opening 24 in the tank 22, a second open end 38, and a plurality of connections 40 for accessing the interior of the conduit 30. In the preferred embodiment, the opening 24 is a tank outlet and the first end 36 of the conduit 30 is connected to the tank outlet 24 and the second end 38 of the conduit 30 is connected to a tank outlet valve 42. The opening 24 may be any outlet, inlet, or other opening at the bottom of the tank 22, but is preferably the outlet through which crude oil is removed from the tank. In the prototype apparatus 20, the first and second ends 36, 38 of the conduit 30 are threaded and the tank outlet 24 includes a threaded coupling, although other types of pipe connections, such as flanges, may be used on the tank 22 and conduit 30. The tank outlet valve 42 may be connected to a pipeline, truck, rail car or other fluid transportation vehicle using piping, a hose, or other fluid conduit (not illustrated).

The detecting means 32 is used for detecting the presence (and absence) of other matter 48, such as sediment, water, and other fluids and substances, in the tank 22 and generating a detection signal indicative thereof. The detecting means 32 includes a sensor 50 connectable to a connection 40 of the conduit 30 so that the sensor 50 extends through the opening 24 into the tank 22. In the preferred embodiment, the sensor includes a water detecting probe 50 which is extendable a selected distance below the level of the opening 24 in the tank 22 in order to detect and indicate the presence of water 48 at a selected level below the opening 24. In the custody transfer of crude oil 21 from storage tanks, it is customary to refuse purchase of the contents of the tank if the water level is not more than a predetermined distance below the opening. This distance is fixed at 4 inches by regulations in most states, although it is 6 inches in at least one state (Texas). Therefore, in the preferred embodiment, the water probe 50 will be extended to detect and indicate the presence of water within a predetermined distance (normally 4 or 6 inches) below the opening 24. Preferably, the water probe 50 will extend downward and into the tank 22 through the opening 24 and through a skewed connection 41 on the top of the conduit 30.

In the prototype apparatus 20, the water detecting probe 50 includes an electrically-conductive rod 50 that extends into, but is electrically isolated from, the conduit 30 and tank 22. The electrical isolation is provided by an insulating sheath or coating 51 which surrounds the electrically-conductive rod 50 except at its ends. If water (or other electrically-conductive matter) is present in the tank, it will complete an electrical circuit which includes the probe, tank, and conduit, thus providing a detection signal to the computer means 56 indicating the presence (or absence) of electrically-conductive matter. If the tank 22 or conduit 30 is not electrically-conductive, a second probe (not illustrated) may be extended through the opening into the tank to complete an electrical circuit with the first probe and electrically-conductive matter. Also, multiple probes of varying lengths (and orientations) may be used to monitor substances present at various levels in the tank 22.

Referring to the example of FIG. 2, the apparatus 20 also includes sampling means 52 which is connectable to a connection of the conduit 30 for taking samples of the liquid transferred to or from the storage tank 22. The sampling means 52 may simply be a valve, also designated 52, such as a slide petcock type valve, which may be manually operated to remove liquid or crude oil from the tank 22 as the liquid is being transferred from the tank 22. Preferably the sampling means 52 will be a partially or fully automated sampler, such as one of the commercially available crude oil samplers, which is adapted to be controlled by computer means 56.

The measuring means 34 is connectable to a connection 40 of the conduit 30 for measuring and indicating the quantity of fluid transferred. In the preferred embodiment, the measuring means 34 includes pressure sensing means 54 for generating a pressure signal indicative of the pressure of the liquid in the tank 22, computer means 56 for receiving and using the pressure signal to generate a level signal indicative of the level of the liquid in the tank, and display means 58 for receiving and using the level signal to display the level of the liquid in the tank 22. The prototype pressure sensing means 54 is a pressure transducer or sensor 54 which converts the hydrostatic pressure in the tank to an electrical signal. The computer means 56 receives the pressure signal, processes it to calculate the level of liquid corresponding to the hydrostatic pressure represented by the pressure signal, and generates the level signal; and the display means 58 receives the level signal from the computer means 56 and converts it to an alphanumeric display; as would be known to one skilled in the art in view of the disclosure contained herein. The display means 58 is also used to receive and display the detection signal from the detecting means 32. The computer means 56 and display means 58 are integral components of the measuring means 34 in the prototype apparatus 20, as illustrated in FIGS. 2 and 3.

In the preferred embodiment, the measuring means 34 includes communication means 60 for receiving an input signal indicative of the density of the liquid in the tank 22 and generating a density signal. Preferably, the communication means 60 includes a keypad, also designated 60, for manually inputting the input signal as well as communication circuitry which provides electronic communication capabilities through an analog or digital input output port(s) 62 (FIG. 3). In a more preferred embodiment, the communication means 60 and port 62 provide for two-way electronic communications between the apparatus 20 and a remote location through an electronic communications system, such as a telephone system, as is further discussed below. Therefore, the input signal may be manually input with the keypad 60 or input from a densitometer, analyzer, or the like (not illustrated) through the analog or digital input output port 62. The computer means 56 receives and uses the pressure signal (or the level signal) and the density signal to generate a density-corrected level signal. The display means receives the density-corrected level signal and displays the density-corrected level of the liquid in the tank 22. In other words, the computer means 56 receives the pressure signal and the density signal and processes them to calculate the density-corrected level and transmits the density-corrected level signal to the display means 58 which displays the density-corrected level. The computer means 56 also stores or records the level signals and density signals for use in other operations and for use in making a permanent record of the liquid transfer.

It is contemplated that the computer means 56 may be used to calculate the density, and generate the density signal. For example, a second pressure sensor (or pressure sensing point with appropriate piping and automated valving connected to the pressure sensing means 54), not illustrated, may be located at a known elevation above the pressure sensing means 54, connected to the computer means 56 to provide a second hydrostatic pressure signal to the computer means 56, and the computer means may be programmed to interrogate the sensor(s), take the difference in the hydrostatic pressure readings (differential pressure), and calculate the density of the liquid in the tank 22 using the difference in elevation of the locations of the two pressure sensors (i.e., using the differential pressure and the height of the fluid column between the two sensing points), as would be known to one skilled in the art in view of the disclosure contained herein.

In the preferred embodiment, the apparatus 20 also includes temperature sensing means 66 for generating a temperature signal indicative of the temperature of the liquid transferred to or from the tank 22. The temperature sensing means 66 may be virtually any type of temperature transducer suitable for the expected environmental conditions. In the prototype apparatus, the temperature sensing means 66 is a temperature probe which extends into the liquid in the conduit 30 and which converts the temperature of the liquid into an electrical signal. The computer means 56 receives the temperature signal and uses the density signal, pressure (or level) signal, and temperature signal to generate a temperature-corrected level signal indicative of the level of the liquid in the tank 22 at the temperature of the liquid sensed by the probe 66. The display means 58 receives and uses the temperature-corrected level signal to generate a display of the temperature-corrected level of the liquid in the tank 22. In other words, the computer means 56 receives the temperature signal, density signal, pressure signal, and temperature signal; processes them to calculate the temperature-corrected level of liquid in the tank 22, based on the information represented by the signals; and transmits the temperature-corrected level signal to the display means 58 to display the temperature-corrected level on the display means 58.

In a first embodiment of the computer means 56, the computer means receives and uses or processes the pressure signal, temperature signal, and density signal to generate or calculate a volume signal indicative of the volume of the liquid in the tank. The first embodiment of the computer means 56 includes tank tables in its program memory or data base for the tank 22 from which oil is being transferred. As is known in the industry, tank tables are prepared for each crude oil storage tank which accurately define the volume of liquid in the tank at any measured depth (or height) of fluid in the tank. The computer means 56 accesses the tank tables for the tank 22 being "run" to determine the volume of liquid in the tank 22 once it has calculated the level of the fluid in the tank using the pressure signal, temperature signal, and density signal, as would be known to one skilled in the art in view of the disclosure contained herein. The first embodiment of the computer means 56 also generates an initial volume signal and a final volume signal indicative of the initial volume and final volume of liquid in the tank (i.e., before and after transfer of liquid to or from the tank) and uses the initial and final volume signals to generate a volume transferred signal indicative of the volume of liquid transferred to or from the tank (e.g., by subtracting the information represented by the signals). The display means 58 receives and uses the initial volume signal, final volume signal, and volume transferred signal to generate a display of the initial volume of liquid in the tank, final volume of liquid in the tank, and volume of liquid transferred. The computer means also records or stores the initial volume signal, final volume signal, and volume transferred signal.

In a second embodiment of the computer means 56, the communication means 60 receives input signals indicative of the volumes of liquid at selected levels of liquid in the tank and generates correlating reference signals. The computer means 56 receives and uses or processes the reference signals, pressure signal, temperature signal, and density signal to generate or calculate a volume signal indicative of the volume of liquid in the tank 22. In this second embodiment of the computer means, the computer means 56 does not contain tank tables in its program memory which relate the volume of a specific tank to the levels of liquid in the tank. Therefore, the communication means 60 is used to input signals indicative of the volumes of liquid at selected levels of liquid in the tank, i.e., the operator may read the levels from the display means 58 and manually refer to printed tank tables to obtain the corresponding volumes and manually input the volumes using the keypad 60 of the communication means 60; or the operator may use the communication means 60 and port 62 to load the tank tables for a particular tank into the program memory of the computer means 56 at the time it is desired to use the computer means 56 with the particular tank. In the second embodiment of the computer means 56, the display means 58 also receives and uses or processes the volume signals to display the volume of liquid in the tank 22.

Similarly, in the second embodiment of the computer means 56, the communication means 60 receives an initial input signal indicative of an initial volume of liquid in the tank and generates an initial volume signal and receives a final input signal indicative of a final volume of liquid in the tank 22 and generates a final volume signal. Again, the volume signals are manually input by the operator as discussed in the previous paragraph. The computer means 56 receives and uses or processes the initial volume signal and final volume signal to generate a volume transferred signal indicative of the volume of liquid transferred to or from the tank, i.e., the computer means subtracts the volumes represented by the signals to calculate the volume of liquid transferred. The display means 58 receives and uses or processes the initial volume signal, final volume signal, and volume transferred signal to generate a display of the initial volume of liquid, final volume of liquid, and volume of liquid transferred. The computer means 56 records or stores the initial volume signal, final volume signal, and volume transferred signal for operational use and as part of its permanent record.

In both embodiments of the computer means 56, the communication means 60 may receive an input signal indicative of selected environmental conditions and generate a standardization signal. The computer means 56 receives and uses or processes the standardization signal, pressure signal, temperature signal, density signal, and volume transferred signal to generate or calculate a corrected volume transferred signal indicative of the volume of liquid transferred at selected environmental conditions. This feature allows the operator to select and correct the volume transferred to standard conditions, e.g., it is customary in the custody transfer of crude oil to correct the volume transferred to that of the liquid transferred at a temperature of 60° Fahrenheit. The environmental conditions may be manually input or the computer means 56 may be programmed to automatically make such correction, as would be known to one skilled in the art in view of the disclosure contained herein. The display means 58 receives and uses the corrected volume transferred signal to display or generate a display of the corrected volume of liquid transferred. The computer means 56 also stores or records the corrected volume transferred signal for other operations and as part of a permanent record of the transfer of liquid.

Further, in both first and second embodiments of the computer means 56, the communication means 60 receives an input signal indicative of the quantity of other matter in the liquid and generates a quality signal. In the prototype apparatus 20, the operator takes a sample of the liquid from the sampling means 52, analyzes the sample, and manually inputs the input signal using keypad 60. It is contemplated that an oil sample analyzer, such as a Karl Fischer Titrator, may be directly connected to the computer means 56 via analog or digital port 62 so that the input signal is automatically accessed by the computer means 56; and that the entire sampling and analysis process may be executed by the computer means 56 by using an automated sampler and analyzer. The computer means receives and uses or processes the quality signal and the corrected volume transferred signal to generate or calculate a net corrected volume transferred signal indicative of the corrected volume of liquid transferred exclusive of other matter, i.e., the computer means is programmed to receive the quality signal and deduct the quantity of other matter, normally basic sediment and water, from the volume of crude oil transferred. This programming would be known to one skilled in the art in view of the disclosure contained herein. The display means 58 receives and uses or processes the net corrected volume transferred signal to generate a display of the net corrected volume of liquid transferred. The computer means records or stores the net corrected volume transferred signal as part of its permanent, reproducible record of the liquid transferred.

Apparatus 20 also provides for remotely measuring the quantity of a liquid, such as crude oil, transferred to or from a storage tank with all measurements being taken through an opening 24 near the bottom of the tank. That is, the apparatus 20 may be operated from a remote location, such as the tank owner's offices, the crude oil purchaser's offices, or virtually any location from which electronic communications may be made with the apparatus 20. Although all of the previously discussed features of the apparatus 20 will not be described in connection with the remotely operated apparatus 20, it is intended to be understood that the remotely operated apparatus 20 and the previously discussed apparatus 20 are one and the same and may include the same features. The communication means 60, when used with the remotely operated apparatus 20, must include communication circuitry for two-way electronic communications. If the apparatus 20 is to be dedicated for remote operation only, some of the features of the apparatus 20, such as the display means 58, keypad, and some of the computing capabilities of the computer means 56 may be eliminated on the apparatus installed at the well site (the "local" apparatus) and may be installed at the remote location, as would be known to one skilled in the art in view of the disclosure contained herein. The detecting means 32, pressure sensing means 54, temperature sensing means 66, and communication means 60 must be located on the apparatus at the tank 22. Preferably, the entire apparatus 20 will be located at the tank 22 so that the apparatus 20 may be operated from the tank 22 or from a remote location.

Referring to the examples of FIGS. 1 and 2, the remotely operated apparatus 20 includes conduit 30 having a first open end 36 connectable to the opening 24 in the tank 22, a second open end 38, and a plurality of connections 40 for accessing the interior of the conduit. Detecting means 32 is connectable to a connection of the conduit for detecting the presence of other matter in the tank and generating a detection signal indicative of the presence and/or absence of other matter in the tank. Measuring means 34 is connectable to a connection 40 of the conduit 30 for measuring and indicating the quantity of liquid transferred. For remote operation, the measuring means 34 includes communication means 60 for receiving an enabling signal from a remote location and enabling the apparatus 20 to initiate, measure, and terminate a liquid transfer and for transmitting the detection signal and the measurements and indications of the measuring means 34 to the remote location, i.e., the measuring means 34 produces output signals which indicate the quantity and properties of the liquid transferred and the communication means 60 receives the output signals and transmits them to the remote location. As previously mentioned, the communication means 60 includes communication circuitry which provides electronic communication capabilities through analog or digital input/output port(s) 62 (FIG. 3). The communication means 60 includes a modem (not illustrated), which may be built into the communication circuitry or externally connected to the port 62, to enable two-way electronic communications between the apparatus 20 and a remote location, as would be known to one skilled in the art in view of the disclosure contained herein.

The remotely operated apparatus 20 includes sampling means 52 which is connectable to a connection 40 of the conduit 30 for taking samples of the liquid transferred to or from the storage tank 22. The communication means 60 uses or processes the enabling signal from the remote location to enable the sampling means 52 to automatically take a sample of the liquid as it is transferred to or from the tank 22. Preferably, the sampling means 52 will take a composite sample of the liquid transferred, as is further discussed below. It is contemplated that the preferred sampling means 52 will be one of the commercially available automated samplers designed for crude oil sampling.

Referring to the examples of FIGS. 1 and 3, in the preferred remotely operated apparatus 20, the measuring means 34 includes pressure sensing means 54 for generating a pressure signal indicative of the pressure of the liquid in the tank 22 and temperature sensing means 66 for generating a temperature signal indicative of the temperature of the liquid in the tank 22. The communication means 60 receives the pressure and temperature signals and transmits them to the remote location where the signals may be used to calculate the initial and final levels of liquid in the tank and the volume transferred.

The remotely operated apparatus 20 may also include computer means 56 for receiving and using or processing the pressure signal and temperature signal to generate a temperature-corrected level signal indicative of the level of the liquid in the tank 22 at the temperature of the liquid indicated by the temperature signal and the communication means may receive and transmit the temperature-corrected level signal to the remote location. In other words, the level calculations may be made by the apparatus 20 and transmitted to the remote location. Further, the computer means 56 may generate or calculate an initial level signal indicative of the level of the liquid in the tank 22 before the liquid transfer is initiated and a final level signal indicative of the level of the liquid in the tank after the liquid transfer is terminated and the communication means may receive and transmit the initial and final level signals to the remote location.

The method of the present invention includes detecting the presence of other matter 48 in the tank 22 and generating a detection signal using the sensor 50 extending through the opening 24 into the tank 22. Preferably, the sensor 50 is a water detecting probe which is extended a selected distance (normally 4 or 6 inches, as discussed above) below the level of the opening 24 in the tank 22 in order to detect and indicate the presence of water at the selected level below the opening. The method includes sampling the liquid transferred to or from the storage tank 22 through the opening 24 in the tank 22 for purposes of analyzing the liquid, i.e., to determine the density, composition, or other characteristics of the liquid.

The method includes measuring and indicating the quantity of fluid transferred using a measuring means 34 connected to the opening 24 in the tank 22. The measuring step is accomplished by sensing the pressure of the liquid through the opening 24 in the tank 22 and generating a pressure signal indicative of the pressure of the liquid in the tank 22, using the pressure signal to generate or calculate a level signal indicative of the level of the liquid in the tank 22, and using the level signal to display and record the level of the liquid in the tank 22. The detection signal may be used to display and record the presence and/or absence of other matter, such as water, in the tank 22.

The method provides for generating and recording a density signal indicative of the density of the liquid in the tank, using the pressure (or level) signal and the density signal to generate or calculate a density-corrected level signal, and using the density-corrected level signal to generate a display of and record the density-corrected level of the liquid in the tank. The method provides for sensing the temperature of the liquid through the opening 24 in the tank 22 and generating and recording a temperature signal indicative of the temperature of the liquid transferred to or from the tank; using the pressure (or level) signal, density signal, and temperature signal to generate or calculate a temperature-corrected level signal indicative of the level of liquid at the temperature of the liquid in the tank 22; and using the temperature-corrected level signal to generate a display of and record the temperature-corrected level of the liquid in the tank.

The method further provides for using the pressure signal, temperature signal, and density signal to generate or calculate a volume signal indicative of the volume of liquid in the tank. This may be accomplished using tank tables which are contained in computer memory and which relate the level of liquid in the tank to the volume of liquid present, or by generating reference signals indicative of the volumes of liquid at selected levels of liquid in the tank and using the reference signals, pressure signal, temperature signal, and density signal to generate or calculate a volume signal indicative of the volume of liquid in the tank, i.e., the reference signals may be manually input by the operator who has read the level of liquid in the tank and converted the level to a volume manually. The method provides for using the volume signal to generate a display of and record the volume of liquid in the tank.

The method also provides for generating an initial volume signal indicative of an initial volume of liquid in the tank; generating a final volume signal indicative of a final volume of liquid in the tank 22; using the initial volume signal and the final volume signal to generate or calculate a volume transferred signal indicative of the volume of liquid transferred to or from the tank 22; and using the initial volume signal, final volume signal, and volume transferred signal to generate a display of and record the initial volume of liquid in the tank, final volume of liquid in the tank, and volume of liquid transferred.

The method provides for generating a standardization signal indicative of selected environmental conditions, such as the oil industry standard temperature of 60° F. previously discussed; using the standardization signal, pressure signal, temperature signal, density signal, and volume transferred signal to generate or calculate a corrected volume transferred signal indicative of the volume of liquid transferred at the selected environmental conditions; and using the corrected volume transferred signal to generate a display of and record the corrected volume of liquid transferred.

The method further provides for generating a quality signal indicative of the quantity of other matter (sediment and water in the preferred embodiment) in the liquid; using the quality signal and the corrected volume transferred signal to generate or calculate a net corrected volume transferred signal indicative of the corrected volume of liquid transferred exclusive of other matter; and using the net corrected volume transferred signal to generate a display of and record the net corrected volume of the liquid transferred.

The method of the present invention also provides for remotely measuring the quantity of the liquid, such as crude oil, transferred to or from a storage tank 22 with all measurements being taken through an opening 24 near the bottom of the tank 22. That is, the method also provides for measuring the liquid transfer from a remote location, such as the tank 22 owner's offices, the crude oil purchaser's offices, or any suitable location from which electronic communications may be made with the tank 22. Although all of the previously discussed features and steps of the method of the present invention will not be described in connection with the method of remotely measuring the liquid transfer, it is intended to be understood that the method of remote measurement includes all of the previously discussed features and steps suitable or adaptable for remote operation.

Referring to the example FIGS. 1–3, the method of remote measurement includes detecting the presence of other matter in the tank and generating a detection signal using the sensor 50 extending through the opening 24 into the tank 22, and measuring and indicating the quantity of liquid transferred using measuring means 34 connected to the opening 24 in the tank 22. The remote measuring step includes enabling the initiation, measurement, and termination of a liquid transfer with an enabling signal from a remote location; and transmitting the detection signal and the measurements and indications of the measuring means to the remote location. In other words, as previously discussed, the measuring means 34 produces or generates output signals which indicate the quantity and properties of the liquid transferred and the output signals are transmitted to the remote location for display, processing, recordation, and other informational and computational purposes.

The remote measuring step provides for sensing the pressure of the liquid through the opening 24 in the tank 22 and generating a pressure signal indicative of the pressure of the liquid in the tank 22; sensing the temperature of the liquid through the opening in the tank 22 and generating a temperature signal indicative of the temperature of the liquid; and transmitting the pressure and temperature signals to the remote location. The measuring step further provides for receiving and using or processing the pressure signal and temperature signal to generate or calculate a temperature-corrected level signal indicative of the level of the liquid in the tank 22 at the temperature of the liquid indicated by the temperature signal, and transmitting the temperature-corrected level signal to the remote location. The measuring step further provides for generating an initial level signal indicative of the level of the liquid in the tank 22 before the liquid transfer is initiated; generating a final level signal indicative of the level of the liquid in the tank 22 after the liquid transfer is terminated; and transmitting the initial and final level signals to the remote location. The method of remote measurement also provides for enabling the sampling of the liquid transferred to or from the storage tank 22 with an enabling signal from the remote location.

Figure 4A:
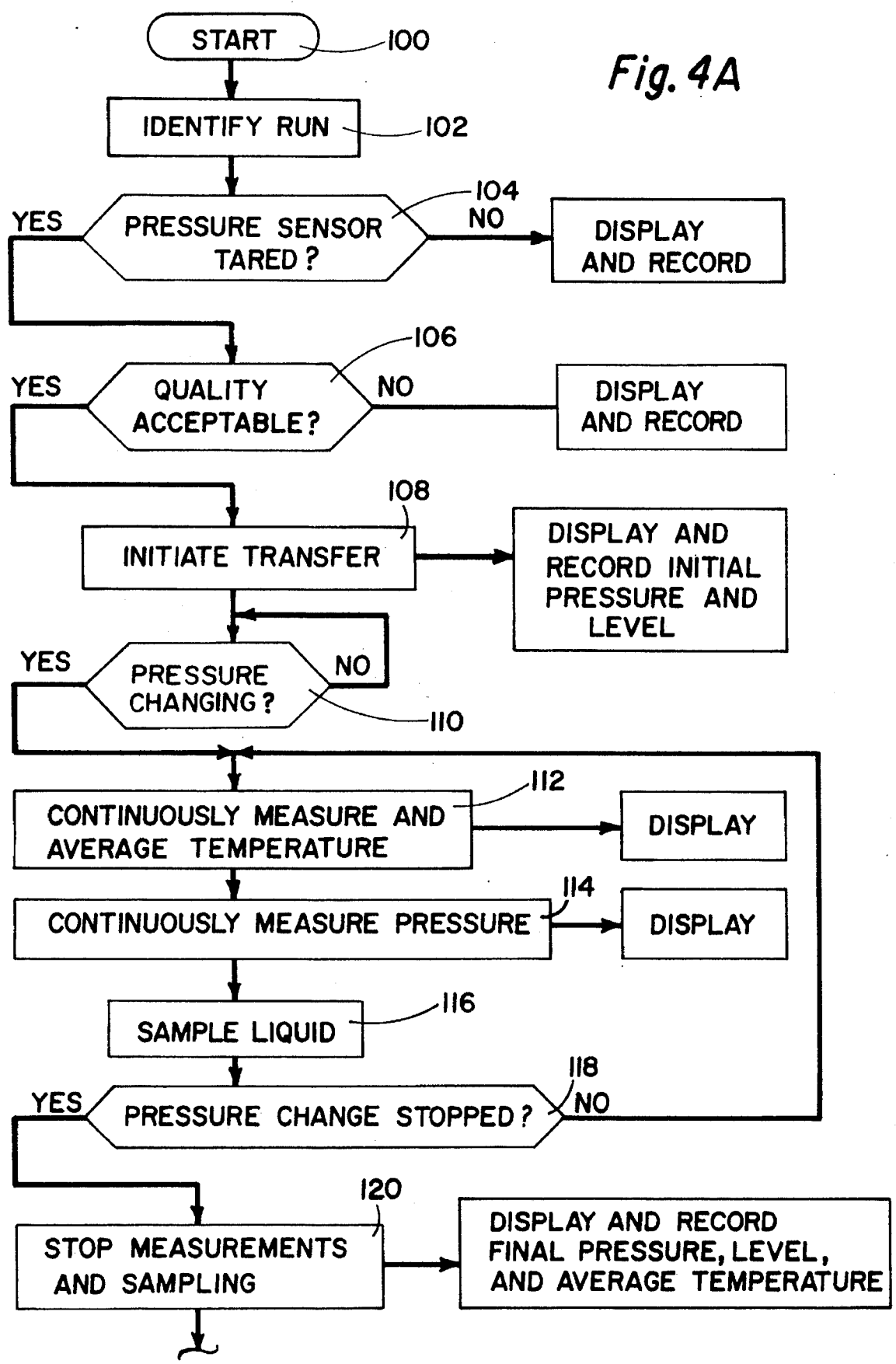
FIGS. 4A and 4B are a flowchart of an activity sequence and computer program utilized by the present invention.
Figure 4B:
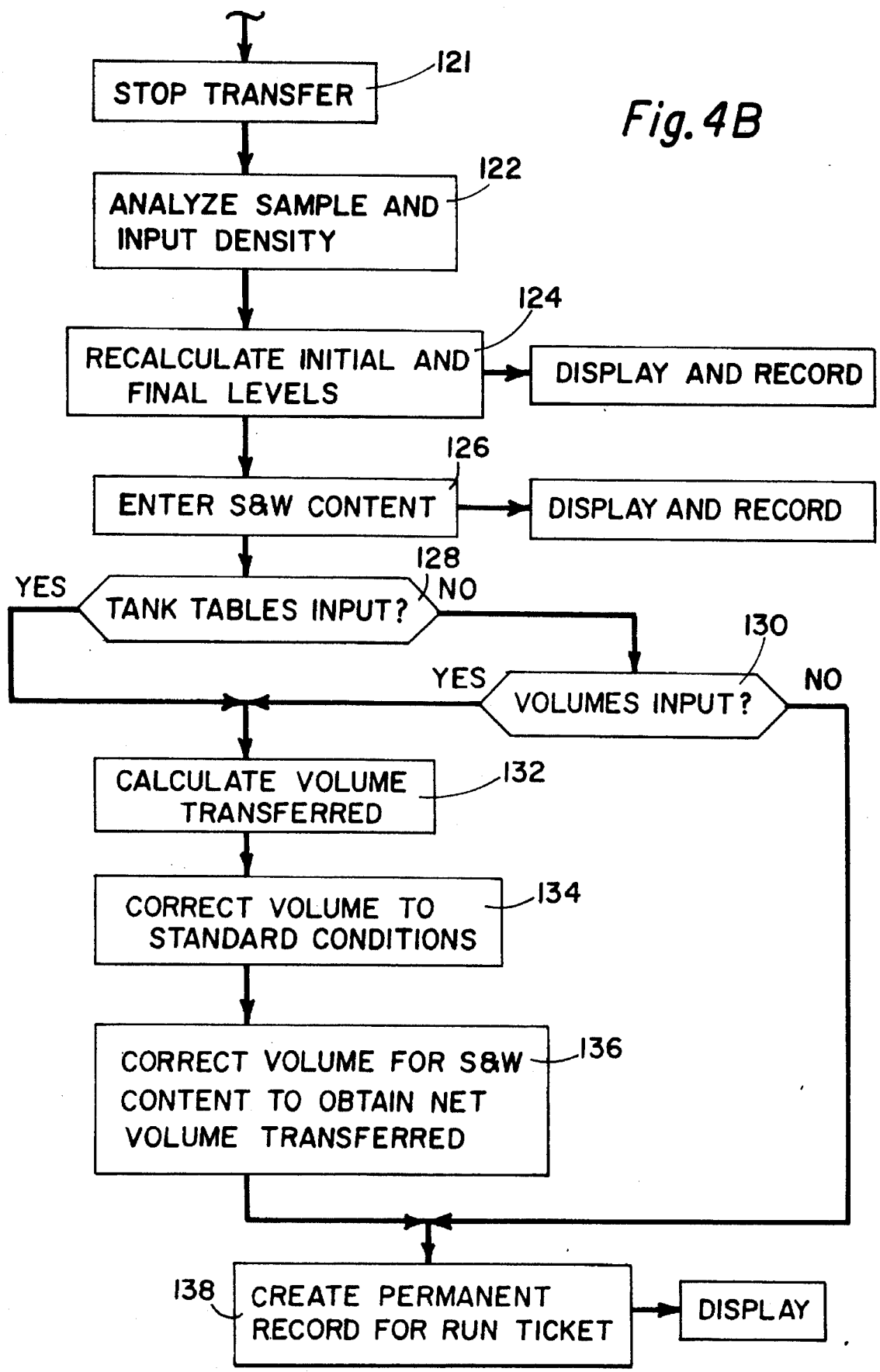

The computer means 56 of the prototype apparatus 20 includes a program which measures the quantity of crude oil transferred to or from a storage tank utilizing a sequence of operations, such as that exemplified in FIG. 4. The apparatus 20 is enabled or rendered operative at a start step 100 when the operator turns the computer means 56 on. At identify run step 102, data is entered which identifies the tank 22 to or from which liquid is transferred and which identifies the specific "run" (i.e., the specific transfer of liquid) so that the computer means 56 can create a run record identifiable to the transfer or run. As part of the identify run step 102, the operator requests a record of the date and time. If the date and time are unavailable internally, the program will prompt the operator to enter the date and time using the data entry keypad 60. The operator enters the lease number identifying the lease upon which the tank 22 is situated, enters the destination code, e.g., identifies the pipeline or entity to which custody of the liquid is transferred, enters the seal number of the seal existing on the tank before the transfer is made, and approves or selects the units of measurement which will be used, e.g., metric, British, etc.

At the pressure sensor tared step 104, the pressure sensor is exposed to atmospheric pressure to establish a reference point against which the hydrostatic pressure of the liquid in the tank 22 is measured. Normally, the contents of the tank 22 will be at approximately atmospheric pressure and the pressure sensor or pressure sensing means 54 will measure the hydrostatic pressure created by the height of the liquid in the tank 22. Therefore, taring the pressure sensor 54 to atmospheric pressure allows the pressure sensor to accurately reflect the hydrostatic pressure of the fluid in the tank 22. If the tank 22 is a sealed tank, the pressure sensor 54 may be connected to the vapor at the top of the tank using a pipe or conduit and tared against the vapor pressure in the tank, or a separate pressure sensor may be connected to the vapor at the top of the tank and the vapor pressure within the tank subtracted from the reading of the liquid pressure sensor 54 in order to obtain an accurate reading of the hydrostatic pressure of the liquid in the tank.

The pressure sensor tared step 104 may be accomplished automatically by the computer means 56 i.e., the computer means 56 may be programmed to expose the pressure sensor 54 to atmospheric pressure, to record the output of the pressure sensor 54 when exposed to atmospheric pressure, and to thereby tare the pressure sensor 54. In the prototype apparatus 20, the pressure sensor 54 is tared manually, i.e., the operator exposes the pressure sensor to atmospheric pressure before the pressure sensor is connected to the conduit 30. If the pressure sensor 54 is an integral component of the conduit 30 or if the apparatus 20 is otherwise designed such that the pressure sensor cannot be removed from the conduit 30 for taring, a 3-way valve may be connected between the pressure sensor 54 and the conduit 30 so that the pressure sensor 54 may be exposed to atmosphere for taring and exposed to the contents of the tank 22 by switching the 3-way valve, as would be known to one skilled in the art in view of the disclosure contained herein. If the apparatus 20 is unable to tare the pressure sensor 54 automatically (or to receive a tare signal from the manually tared pressure sensor), an error message is displayed on the display means 58 and permanently stored in the run record.

The prototype computer means 56 uses the detection signal to discriminate at the quality acceptable step 106 as to whether the water level is within 4 inches (or other preselected distance) of the outlet 24. If the water level is within 4 inches of the outlet 24, a message is displayed on the display means 58 asking the operator to turn down the tank. If the tank is turned down, the turndown is permanently recorded, the existing seal number is entered as a new seal number, and the display means returns to the main menu, i.e., the menu which is displayed when the apparatus 20 is turned on. If the operator decides not to turn down the tank (i.e., to make the run in spite of the unacceptable water level), the program displays and permanently records the unacceptability of the water level.

At the initiate transfer step 108, the operator enters a command telling the apparatus 20 and program to prepare for transfer of liquid. At this time the operator may take an outlet sample of the liquid in the tank, determine the sediment and water content of the sample and the density of the sample, enter the density or an estimate of the density into the computer means 56 using the keypad 60, and enter the temperature at which the density was observed (the computer will use a default temperature, such as 60° F., and a default density if the operator does not enter them). The computer means 56 may also be programmed to enter this information automatically based on averages of prior runs or based on the analysis of a computer controlled analyzer, such as a densitometer. If a computer controlled sampler is in use, the program will prompt the operator to enter the amount of liquid to be transferred to or from the tank and to enter the tank size (usually diameter) so that the program may calculate a sampling rate which will provide a composite sample which is representative of the liquid at various levels in the tank. At this time the program also measures and records the initial pressure in the tank, calculates the estimated starting level of liquid in the tank (based on the initial pressure and the density and temperature entered above), displays the initial pressure and the estimated initial level on the display means, and starts storing a buffer of temperature readings. The program starts monitoring the pressure sensor for pressure change which indicates the transfer of liquid. If a manually controlled sampler is in the system, the operator sets the sampling rate at this time. Alternatively, the operator may set the sampling rate by watching the rate at which the level of liquid in the tank changes or may take samples manually at intervals during the transfer (if the sampling means 52 is simply a valve).

At the pressure changing step 110, the program discriminates as to whether the hydrostatic pressure in the tank 22 is changing. If the pressure signal is changing, the program begins averaging the temperature readings. During the liquid transfer (while the pressure is changing), the program continuously monitors the pressure sensor 54 and temperature sensor 66 and thereby continuously measures, averages, displays, and records the temperature of the liquid (step 112); continuously measures and displays the pressure of the liquid in the tank (step 114); and continuously calculates and displays the estimated level of the liquid in the tank. The composite sample of the liquid transferred is also taken throughout the transfer, as indicated at step 116. If a computer controlled sampling means 52 is connected to the apparatus 20, the program adjusts the sampling rate according to the level change rate. If a manually controlled sampling means is connected to the apparatus 20, the operator may adjust the sampling rate as necessary.

At the pressure change stopped step 118, the program monitors the pressure signal to determine whether the hydrostatic pressure in the tank has stopped changing. If the pressure has stopped changing, at step 120 the program stops measuring and averaging temperature, stores the average temperature, stops measuring pressure, stops sampling (if a computer controlled sampling means 52 is being used), records the ending time and date, and displays and records the ending pressure and averaged temperature. At the stop transfer step 121, the operator inputs a stop command, applies a new seal to the tank outlet valve, and enters the new seal number into the program where it is recorded.

At the analyze sample and input density step 122, the operator analyzes the composite sample and determines its sediment and water, or "S & W," (referred to as "other matter" above) content and density. The operator then enters the composite sample's density and the temperature at which the density was observed into the program using communication means or keypad 60. The operator also enters the "standard" density of the sample at the selected standard temperature (currently 60° F. for the transfer of crude oil) which may be taken from API (American Petroleum Institute) tables for crude oil.

At the recalculate initial and final levels step 124, the program recalculates the density-corrected levels based on the analyzed density of the composite sample at the average temperature of the liquid transferred. The program records the recalculated density-corrected levels as part of the permanent run record and displays them on the display means 58.

At the enter sediment and water step 126, the operator enters the sediment and water content of the liquid into the program using communication means or keypad 60. The program records the sediment and water content as part of the run record.

At the tank tables input step 128, the program determines whether tank tables for the identified tank are available to the program, i.e., are stored in the program's memory. If the tank tables are not available, at step 130 the program requests or prompts the operator to manually enter volumes corresponding to the initial and final levels. If the operator declines to enter the requested data and instructs the program to proceed, the program skips to step 138, discussed below. If tank tables are available to the program, the program uses the initial level to obtain the initial volume from the tank table, uses the final level to obtain the final volume from the tank table, and subtracts the initial and final volumes to calculate the volume transferred at step 132. If the operator enters the initial volume and final volume in response to the volumes input step 130, the program simply subtracts the initial and final volumes to calculate the volume transferred at step 132. At step 134 the program corrects the volume transferred to that of the liquid transferred at the selected standard temperature (currently 60° F. in the oil industry). At step 136 the program uses the quality signal, which was input at step 126, to correct the volume transferred for sediment and water content and to obtain the net volume of liquid transferred excluding sediment and water, or "other matter." At step 138 the program makes a permanent record of all data recorded as necessary to create a "run ticket" and will display the run ticket data as requested by the operator. The run ticket is the basis for payments to the producer, royalty owners, and to others for the liquid transferred. If a printer is available, it may be connected to the computer means 56 to print the run ticket. If a modem is available, it may be connected to the port 62 of the computer means 56 to transfer the run record or run ticket data through telephone lines or equivalent communication systems to a remote location or to transfer the run record to another computer.

Figure 5A:
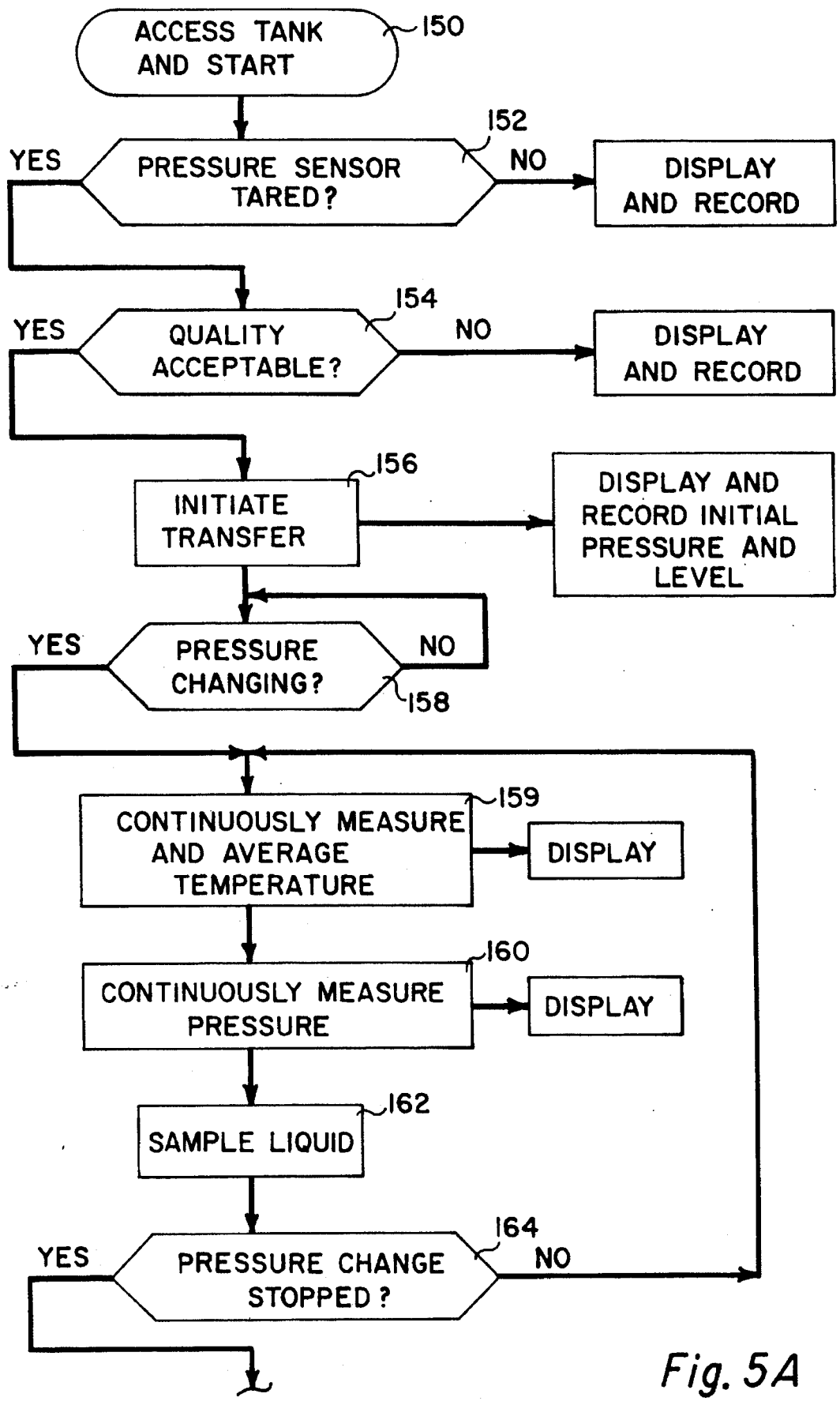
FIGS. 5A and 5B are a flowchart of another activity sequence and computer program utilized by the present invention.
Figure 5B:
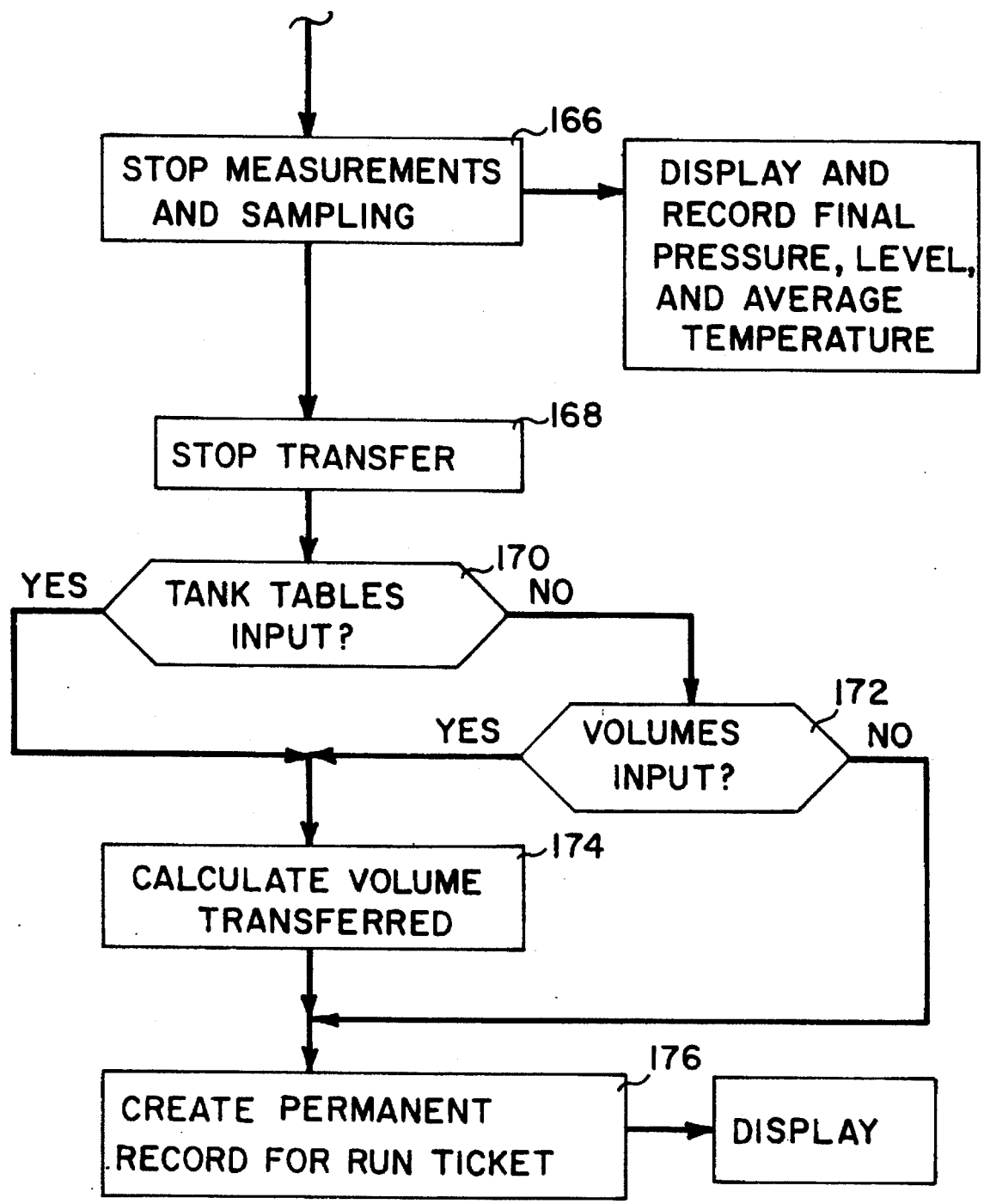

The computer means 56 and apparatus 20 may also include a program which allows remote measurement of the quantity of crude oil transferred to or from a storage tank utilizing a sequence of operations, such as that exemplified in FIG. 5. This sequence will typically be used when the storage tank 22 is connected to a pipeline and a gauger will not be present during the transfer, although it may also be adapted to measure the quantity of liquid transferred between a storage tank 22 and a railway car, tank truck, or the like. At access tank and start step 150 the operator, who will typically be at a remote location, such as the owner's offices or the purchaser's offices, accesses the apparatus 20 through an electronic communications medium, such as a telephone line, to enable the apparatus to initiate, measure, and terminate a liquid transfer. The operator will typically be using a computer and computer keyboard to communicate with the apparatus 20 through the telephone lines, as would be known to one skilled in the art in view of the disclosure contained herein. The operator enters an access code which places the apparatus 20 in communication with the remote computer. The operator then enters appropriate data to render the apparatus 20 operative, or turn it on. Data is then entered which identifies the specific run so that the computer means 56 can create a run record identifiable to the transfer or run. The operator will request a record of the date and time. If the date and time are unavailable internally in the apparatus 20, the program will prompt the operator to enter the date and time from the remote location. The operator enters the lease number identifying the lease upon which the tank 22 is situated, enters the destination code, e.g., identifies the pipeline or entity to which custody of the liquid is transferred, enters the seal number of the seal existing on the sampler 52 at the time the transfer is made, and approves or selects the units of measurement which will be used, e.g., metric, British, etc.

At the pressure sensor tared step 152, the pressure sensor is exposed to a known pressure source, such as atmospheric pressure or the vapor pressure of the tank 22, to establish a reference point against which the hydrostatic pressure of the liquid in the tank 22 is measured, as discussed in detail above. For remote operation, the pressure sensor tared step must be accomplished automatically by the computer means 56, i.e., the computer means 56 will be programmed to expose the pressure sensor 54 to the reference pressure, to record the output of the pressure sensor 54 when it is exposed to the reference pressure, and to thereby tare the pressure sensor 54. This may be accomplished using remotely operated valves which are controlled by the computer means 56, as would be known to one skilled in the art in view of the disclosure contained herein. If the apparatus 20 is unable to tare the pressure sensor 54 automatically, an error message is displayed locally (at the tank 22) on the display means 58 on the apparatus 20 (if a display means 58 is provided on the apparatus 20), is sent to the remote location, is permanently stored in the run record in computer means 56, and the run is terminated. During the liquid transfer the program corrects the measured hydrostatic pressure according to the reference pressure obtained by taring the pressure sensor 54.

The computer means 56 uses the detecting means 32 and detection signal to discriminate at the quality acceptable step 154 as to whether the water level is within four inches (or other preselected distance) of the outlet 24. If the water level is within four inches of the outlet 24, a message is displayed on the display means 58 and sent to the remote location asking the operator to turn down the tank. If the tank is turned down, the turndown is permanently recorded, the existing seal number is entered as a new seal number, and the computer means returns the main menu to the display means and to the remote location, i.e., the menu which is displayed to the operator when the apparatus 20 is accessed and turned on. If the operator decides not to turn down the tank, i.e., to make the run in spite of the unacceptable water level, the program displays (locally and remotely) and permanently records the unacceptability of the water level in the run record.

At the initiate transfer step 156, the operator enters a command telling the apparatus 20 and program to prepare for transfer of liquid. At this time the operator may enter an estimate of the density into the computer means 56 using the remote keypad which the program may use in approximating the level in the tank. The operator may also enter an estimated temperature of the liquid in the tank (the computer will use a default temperature, such as 60° Fahrenheit, and density if the operator does not enter them). The computer means may also be programmed to enter this information (temperature and density signals) automatically based on averages of prior runs or based on the analysis of a computer-controlled densitometer or analyzer. The program will also prompt the operator to enter a sampling rate or to enter the amount of liquid to be transferred to or from the tank and to enter the tank size (usually diameter, if this information is not contained in the program's memory) so that the program may calculate a sampling rate which will provide a composite sample which is representative of the liquid at various levels in the tank. At this time the program also polls the pressure sensor 54 to measure and record the initial pressure in the tank, calculates the estimated starting level of the liquid in the tank (based on the initial pressure and the density and temperature entered above), displays the initial pressure and the estimated initial level on the display means (local and remote), and starts storing a buffer of temperature readings. The program then starts the liquid transfer. Typically this will be accomplished by the program's starting a pump which pumps the liquid from the tank. A back pressure regulator (such as a valve which is opened and closed by the fluid pressure upstream of the valve) is provided downstream of the pump and is used as the tank outlet valve. When the pump is started by the program, the pump discharge pressure increases in the line between the pump and the valve and the pressure is used to open the valve and thereby discharge the contents of the tank through the valve into the pipeline. When the tank 22 has been emptied, or when the pump is disabled, the pressure will decrease between the pump and the valve, thereby closing the valve. The tank outlet valve may also be automated and opened and closed by the program in order to control the liquid transfer, particularly if a pump is not required to transfer the liquid. The program also starts monitoring the pressure sensor for hydrostatic pressure change in the tank which indicates the transfer of liquid.

At the pressure changing step 158, the program discriminates as to whether the hydrostatic pressure in the tank 22 is changing. If the pressure is changing, the program begins averaging the temperature readings. During the liquid transfer (while the pressure is changing), the program continuously monitors the pressure sensor 54 and temperature sensor 66 in order to continuously measure, average, display (locally and remotely), and record the temperature of the liquid (step 159); continuously measure and display (locally and remotely) the pressure of the liquid in the tank (step 160); and continuously calculate and display (locally and remotely) the estimated level of the liquid in the tank 22 (if the computer means 56 is programmed to do so). The composite sample of the liquid transferred is also taken throughout the transfer, as indicated at step 162. If a computer-controlled sampler 52 is connected to the apparatus 20, the program may adjust the sampling rate according to the level change rate. Alternatively, the operator may select and adjust the sampling rate from the remote location.

At the pressure change stopped step 164, the program determines whether the hydrostatic pressure in the tank has stopped changing. If the pressure has stopped changing, at step 166 the program stops measuring and averaging temperature, stores the average temperature, stops measuring pressure, stops sampling, records the ending time and date, and displays (locally and remotely) and records the ending pressure and averaged temperature. The program also stops operation of the pump. At the stop transfer step 168, the remote operator inputs a stop command which permanently terminates the run and prevents any further transfer of liquid for the run.

At the tank tables input step 170, the program determines whether tank tables are available to the program, i.e., are stored in the program's memory. If the tank tables are not available, at step 172 the program requests or prompts the operator to remotely enter volumes corresponding to the initial and final levels. If the operator declines to enter the requested data and instructs the program to proceed, the program skips to step 176, discussed below. If tank tables are available to the program, the program uses the initial level to obtain the initial volume from the tank table, uses the final level to obtain the final volume from the tank table, and subtracts the initial and final volumes to calculate the volume transferred at step 174. If the operator enters the initial volume and final volume at the volumes input step 172, the program simply subtracts the initial and final volumes to calculate the volume transferred at step 174. At step 176 the program makes a permanent record of all data recorded as necessary to create a "run ticket" and will display the run ticket data (locally and remotely) as requested by the operator. In the prototype apparatus 20, the program makes a permanent record in the local apparatus 20 at the well site. The run data may also be permanently recorded at the remote location.

It is contemplated that the gauger will visit the well site at least once a month, at which time he will break the seal on the sampling means 52, take the sample, put a new seal on the sampling means 52, and then analyze the sample to obtain its density and S&W content, either at the tank 22 or in a laboratory. Once the sample has been analyzed, a record will be made of the density and S&W content and the record will be provided to the tank owner and crude oil purchaser so that they may recalculate the volume transferred based on the sample density, correct the volume to standard conditions, and correct the volume for S&W content to obtain the net volume transferred. The sampling means 52 must have sufficient capacity to store samples for the number of runs anticipated between visits of the gauger.

The apparatus 20 may be an integral unit, that is, the conduit 30, detecting means 32, and measuring means 34 may be an integral unit designed to be connected to the tank 22 and left at the tank. In the preferred embodiment, referring to the example of FIG. 3, the apparatus 20 is constructed of two separable units which may be generally described as the conduit 30 which is left connected to the tank 22 and the measuring means 34 which is carried to and from the tank site by the operator. The following components are left at the tank 22 and connected to the conduit 30: the water probe 50, water probe cable 70, cable connection fitting 72 for connecting the water probe cable 70 to the water probe 50, plug connection 74 for connecting the cable 70 to computer support shelf 76 and for receiving the mating water probe plug 78 on the computer means 56, pressure sensor fitting 80 for allowing the probe 54 of the pressure sensor 54 to be quickly inserted into and disconnected from the conduit 30 in a leak-free manner, temperature probe fitting 82 for allowing the temperature probe 66 to be quickly inserted into and disconnected from the conduit 30 in a leak-free manner, sampling valve 52 or a fitting (also designated 52) for quickly connecting and disconnecting the sampling means to the conduit 30 in a leak-free manner, and a shelf 76 which is securely fastened to the conduit 30 and used to support the portable measuring means 34. In the prototype apparatus 20, the shelf 76 includes a flange 84 for mounting the water probe cable connection 74. The portable measuring means 34 includes the computer means 56, display means 58, communication means/keypad 60, pressure sensing means/pressure sensor 54, and temperature sensing means/temperature probe 66, and water probe plug 78. The measuring means 34 will be left operationally connected to the conduit 30 at the tank 22 if the apparatus 20 is to be remotely operated.

The preferred computer means 56 includes a microcontroller, program memory, nonvolatile data memory, combinational logic, communication circuitry (which includes digital and analog input and output connections), digital interface circuitry, analog interface circuitry, signal conditioning circuitry, status indicators, power control circuitry, data display/display means 58, keypad/communication means 60 for controlling data entry, and the software program previously discussed.

The microcontroller uses the software to execute all of the apparatus' functions and control system operation, provides part of the system's digital interface circuitry, and provides oscillator circuitry which generates clock signals needed by the microcontroller, combinational logic, and analog and digital interfaces. Address and data information are multiplexed on the microcontroller's input/output ports. The program memory, which is an EPROM in the preferred embodiment, stores the software which the microcontroller executes as well as associated data. The nonvolatile data memory provides work space for storing run tickets, calibration information, and system configuration. The combinational logic generates control signals to coordinate operation of memory and digital interface circuits and demultiplexes the address and data information output by the microcontroller.

The communication circuitry provides electronic communication capabilities. In the preferred embodiment, the communication circuitry either interfaces the microcontroller to a half duplex communication port or interfaces the microcontroller to a full duplex communication port including handshaking (start/stop) signals. The digital interface circuitry provides for input and output of discrete signals, including keypad input and display output. The analog interface circuitry is based on analog-to-digital converters which translate the pressure, temperature, and water sensor/transducer signals, as well as other external analog signals, into digital information usable by the computer. Signal conditioning circuitry is installed between the transducers and the analog to digital converters. Both the analog and digital interface circuitry allow connection of additional sensors and signals for altered functionality. Indicators, such as light emitting diodes (LEDs), may be used to report status and/or completion of various functions and system failures.

The power control circuitry, which is transistor based, allows the microcontroller to conserve power by disconnecting portions of the system.

The display means 58 is an alphanumeric display module and is used for visual information output. The communication means 60 includes a multi-key keypad for information input and control by the operator and also includes the communication circuitry previously discussed for transferring data (such as tank tables and run records) to and from the computer means 56.

Other components includes bypass capacitors to reduce electrical noise, a power-on reset circuit, and impedance matching circuitry for the analog or digital port 62. The design and assembly of the computer means 56 would be known to one skilled in the art in view of the disclosure contained herein.

The capabilities provided via the software include data entry, system control, data display, data manipulation, communication (electronic data transfer), calibration, power conservation, and help. All functions are available to the operator via menus shown on the display. The main menu provides access to the submenus into which related operations are grouped. The input menu provides for keyboard input of operation and configuration data. The scan menu allows specification of sampling intervals and other time limits (except power conservation, mentioned later). The display menu provides for selection of display formats and of data to be displayed. The files menu provides for storage and retrieval of data records. The communication menu provides for file transfers between the computer and external devices. The calibration menu provides for adjustment of the measurement operations to provide correct data. The power menu provides for selection of power conservation features, such as duration of operation and reduction of power consumption. The help menu provides additional information on operation of the device.

In the prototype apparatus 20, a "tasker" routine schedules execution of various operations performed in the background. These operations include analog calculations, digital calculations, time keeping, keyboard reading, and screen display. The analog calculations consist of those operations used in converting sensor input received via the signal conditioning and analog interface circuitry into data suitable for reporting and use in further calculations. The digital calculations monitor switches and optional digital inputs and control status indicators. The time keeping routine maintains a time clock from which time-of-day and elapsed times may be determined. The keyboard reading routine does what its name implies. The screen display routine does what its name implies.

In the prototype apparatus 20, several other routines operate independently of the tasker. They include time, time input, analog input, and communication routines. The timer generates an interrupt at regular intervals to control execution of other routines. The time input routine sets a flag in response to the time interrupt to indicate that the internal clock should be incremented. The analog input routine reads the analog to digital converter, stores the data, and sets a flag to indicate arrival of new data. Electronic communications are handled by two routines: one to transmit and one to receive.

While presently preferred embodiments of the invention have been described herein for the purpose of disclosure, numerous changes in the construction and arrangement of parts and the performance of steps will suggest themselves to those skilled in the art in view of the disclosure contained herein, which changes are encompassed within the spirit of this invention, as defined by the following claims.

What is claimed is:

1. Apparatus for measuring physical characteristics of a liquid to be transferred to or from a storage tank with all measurements being taken through an opening near the bottom of the tank, comprising:

a conduit having a first open end connected to the opening in the tank, a second open end, and at least one connection for accessing the interior of the conduit between each end;

means insertable from outside the conduit for making a releasable and sealable connection with the at least one connection of the conduit for detecting one or more physical characteristics of the liquid and generating a readable signal representative of the one or more physical characteristics.

2. Apparatus of claim 1 wherein said means includes a measuring means, connectable to the at least one connection of the conduit, for measuring and indicating a quantity of liquid to be transferred.

3. Apparatus of claim 2 in which the measuring means comprises:

pressure sensing means for generating a pressure signal indicative of the pressure of the liquid in the tank;

computer means for receiving and using the pressure signal to generate a level signal indicative of the level of the liquid in the tank; and display means for receiving and using the level signal to display the level of the liquid in the tank.

4. Apparatus of claim 3 in which the measuring means further comprises:

communication means for receiving an input signal indicative of the density of the liquid in the tank and generating a density signal; and wherein the computer means is defined as receiving and using the pressure signal and the density signal to generate a density-corrected level signal; and wherein the display means is defined as receiving the density-corrected level signal and displaying the density-corrected level of the liquid in the tank.

5. Apparatus of claim 4 in which the measuring means further comprises:

temperature sensing means for generating a temperature signal indicative of the temperature of the liquid; and wherein the computer means is defined as receiving the temperature signal and using the density signal, pressure signal, and the temperature signal to generate a temperature-corrected level signal indicative of the level of liquid at the temperature of the liquid indicated by the temperature signal; and wherein the display means is defined as receiving and using the temperature-corrected level signal to display and/or record the temperature-corrected level of the liquid in the tank.

6. Apparatus of claim 5:

wherein the communication means is defined as receiving input signals indicative of the volumes of liquid at selected levels of liquid in the tank and generating correlating reference signals; and wherein the computer means is defined as receiving and using the reference signals, pressure signal, temperature signal, and density signal to generate a volume signal indicative of the volume of liquid in the tank; and wherein the display means is defined as receiving and using the volume signal to display the volume of liquid in the tank.

7. Apparatus of claim 6:

wherein the communication means is defined as receiving an initial input signal indicative of an initial volume of liquid in the tank and generating an initial volume signal, and receiving a final input signal indicative of a final volume of liquid in the tank and generating a final volume signal; and wherein the computer means is defined as receiving and using the initial volume signal and final volume signal to generate a volume transferred signal indicative of the volume of liquid transferred to or from the tank; and wherein the display means is defined as receiving and using the initial volume signal, final volume signal, and volume transferred signal to display and/or record the initial volume of liquid, final volume of liquid, and volume of liquid transferred.

8. Apparatus of claim 7:

wherein the communication means is further defined as receiving an input signal indicative of selected environmental conditions and generating a standardization signal; and wherein the computer means is defined as receiving and using the standardization signal, pressure signal, temperature signal, density signal, and volume transferred signal to generate a corrected volume transferred signal indicative of the volume of liquid transferred at selected environmental conditions; and wherein the display means is defined as receiving and using the corrected volume transferred signal to display and/or record the corrected volume of liquid transferred.

9. Apparatus of claim 8:

wherein the communication means is further defined as receiving an input signal indicative of the quantity of other matter in the liquid and generating a quality signal; and wherein the computer means is defined as receiving and using the quality signal and the corrected volume transferred signal to generate a net corrected volume transferred signal indicative of the corrected volume of liquid transferred exclusive of other matter; and wherein the display means is defined as receiving and using the net corrected volume transferred signal to display the net corrected volume of liquid transferred.

10. Apparatus of claim 5:

wherein the computer means is defined as receiving and using the pressure signal, temperature signal, and density signal to generate a volume signal indicative of the volume of liquid in the tank.

11. Apparatus of claim 10:

wherein the computer means is further defined as generating an initial volume signal and a final volume signal indicative of an initial volume and a final volume of liquid in the tank and using the initial and final volume signals to generate a volume transferred signal indicative of the volume of liquid transferred to or from the tank; and wherein the display means is further defined as receiving and using the initial volume signal, final volume signal, and volume transferred signal to display and/or record the initial volume of liquid in the tank, final volume of liquid in the tank, and volume of liquid transferred.

12. Apparatus of claim 11:

wherein the communication means is further defined as receiving an input signal indicative of selected environmental conditions and generating a standardization signal; and wherein the computer means is defined as receiving and using the standardization signal, pressure signal, temperature signal, density signal, and volume transferred signal to generate a corrected volume transferred signal indicative of the volume transferred at selected environmental conditions; and wherein the display means is defined as receiving and using the corrected volume transferred signal to display and/or record the corrected volume of liquid transferred.

13. Apparatus of claim 12:

wherein the communication means is further defined as receiving an input signal indicative of the quantity of other matter in the liquid and generating a quality signal; and wherein the computer means is defined as receiving and using the quality signal and the corrected volume transferred signal to generate a net corrected volume transferred signal indicative of the corrected volume of liquid transferred exclusive of other matter; and wherein the display means is defined as receiving and using the net corrected volume transferred signal to display and/or record the net corrected volume of liquid transferred.

14. Apparatus of claim 1:

wherein the opening is a tank outlet; and wherein the first end of the conduit is connected to the tank outlet and the second end of the conduit is connected to a tank outlet valve.

15. Apparatus of claim 1 including a detecting means comprised of:

a water detecting probe which is extendable a selected distance below the level of the opening in the tank in order to detect and indicate the presence of water at a selected level below the opening.

16. Apparatus of claim 1, comprising:

sampling means, connectable to the at least one connection of the conduit, for taking samples of the liquid transferred to or from the storage tank.

17. Apparatus of claim 2 in which the measuring means comprises:

pressure sensing means for generating a pressure signal indicative of the pressure of the liquid in the tank;

temperature sensing means for generating a temperature signal indicative of the temperature of the liquid in the tank; and communication means for receiving an enabling signal from a remote location and enabling the apparatus to initiate, measure, and terminate a liquid transfer and for receiving and transmitting the pressure and temperature signals to the remote location.

18. Method of measuring characteristics of a liquid, to be transferred to or from a storage tank with all measurements being taken through a conduit connected to an opening near the bottom of the tank, comprising the steps of:

releasably and sealably inserting into said conduit, a means to communicate with the liquid therein and detect one or more physical characteristics of the liquid, and wherein said means includes generating a readable signal representative of the one or more characteristics.

19. Method of claim 18, including the step of:

sampling the liquid transferred to or from the storage tank through the opening in the tank.

20. Method of claim 18 including the step of:

measuring a quantity of liquid being transferred by computing one or more physical characteristics received from said readable signal.

21. Method of claim 20 in which the measuring step is computed from:

sensing the pressure of the liquid in the conduit and generating a pressure signal indicative of the pressure of the liquid in the tank;

using the pressure signal to generate a level signal indicative of the level of the liquid in the tank; and using the level signal to display and record the level of the liquid in the tank.

22. Method of claim 21, comprising the further steps of:

generating and recording a density signal indicative of the density of the liquid in the tank;

using the pressure signal and the density signal to generate a density-corrected level signal; and using the density-corrected level signal to display and record the density-corrected level of the liquid in the tank.

23. Method of claim 22, comprising:

sensing the temperature of the liquid through the opening in the tank and generating and recording a temperature signal indicative of the temperature of the liquid;

using the pressure signal, density signal, and temperature signal to generate a temperature-corrected level signal indicative of the level of liquid at the sensed temperature of the liquid; and using the temperature-corrected level signal to display and record the temperature-corrected level of the liquid in the tank.

24. Method of claim 22, comprising:

generating reference signals indicative of the volumes of liquid at selected levels of liquid in the tank;

using the reference signals, pressure signal, temperature signal, and density signal to generate a volume signal indicative of the volume of liquid in the tank; and using the volume signal to display and record the volume of liquid in the tank.

25. Method of claim 24, comprising:

generating an initial volume signal indicative of an initial volume of liquid in the tank;

generating a final volume signal indicative of a final volume of liquid in the tank;

using the initial volume signal and the final volume signal to generate a volume transferred signal indicative of the volume of liquid transferred to or from the tank; and using the initial volume signal, final volume signal, and volume transferred signal to display and record the initial volume of liquid in the tank, final volume of liquid in the tank, and volume of liquid transferred.

26. Method of claim 24, comprising:

generating a standardization signal indicative of selected environmental conditions;

using the standardization signal, pressure signal, temperature signal, density signal, and volume transferred signal to generate a corrected volume transferred signal indicative of the volume of liquid transferred at selected environmental conditions; and using the corrected volume transferred signal to display and record the corrected volume of liquid transferred.

27. Method of claim 26, comprising:

generating a quality signal indicative of the quantity of contaminants in the liquid;

using the quality signal and the corrected volume transferred signal to generate a net corrected volume transferred signal indicative of the corrected volume of liquid transferred exclusive of contaminants; and using the net corrected volume transferred signal to display and record the net corrected volume of liquid transferred.

28. Method of claim 23, comprising:

using the pressure signal, temperature signal, and density signal to generate a volume signal indicative of the volume of liquid in the tank.

* * * * *